(12) United States Patent
Eller et al.

(10) Patent No.: US 11,546,011 B1
(45) Date of Patent: Jan. 3, 2023

(54) RF DEVICE WITH BIASING CIRCUIT FOR PIN DIODE AND RELATED METHODS

(71) Applicant: HARRIS GLOBAL COMMUNICATIONS, INC., Albany, NY (US)

(72) Inventors: Andrew J. Eller, Naples, NY (US); John Robert McIntyre, Rochester, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 0 days.

(21) Appl. No.: 17/447,729

(22) Filed: Sep. 15, 2021

(51) Int. Cl.
*H04B 1/44* (2006.01)

(52) U.S. Cl.
CPC ...................... *H04B 1/44* (2013.01)

(58) Field of Classification Search
CPC ... H04B 1/40; H04B 1/44; H04B 1/48; H03K 17/74; H03K 17/567; H02M 3/155; H01P 1/15
See application file for complete search history.

(56) References Cited

U.S. PATENT DOCUMENTS

| | | | |
|---|---|---|---|
| 5,115,215 A | 5/1992 | Koontz | |
| 9,391,652 B1 | 7/2016 | McIntyre | |
| 9,424,417 B2 | 8/2016 | Brown et al. | |
| 9,445,305 B2 | 9/2016 | Lyon et al. | |
| 9,564,892 B2 | 2/2017 | Liu et al. | |
| 9,603,013 B2 | 3/2017 | Niewczas et al. | |
| 9,917,579 B2 | 3/2018 | Foley et al. | |
| 10,110,218 B2 | 10/2018 | Foley et al. | |
| 2009/0153066 A1* | 6/2009 | Yang | H05B 45/35 315/192 |
| 2014/0210377 A1* | 7/2014 | Knoedgen | H02M 3/33507 363/16 |
| 2015/0280584 A1* | 10/2015 | Gong | H02M 3/33515 363/21.13 |
| 2017/0149238 A1* | 5/2017 | Hutcheson | H04B 7/00 |
| 2018/0013425 A1* | 1/2018 | Foley | H03K 17/74 |
| 2020/0274575 A1* | 8/2020 | Yang | H04L 5/16 |

FOREIGN PATENT DOCUMENTS

| | | |
|---|---|---|
| JP | 6630679 | 8/2017 |
| KR | 20140061519 | 5/2014 |

OTHER PUBLICATIONS

Infineon "PIN diodes in RF switch applications" www.infineon.com Aug. 30, 2018; pp. 46.
Digi-Key's North American Editors "How and Why to Use PIN Diodes for RF Switching" DigiKey, Dec. 28, 2016, www.digikey.com/en/articles/how-and-why-to-use-pin-diodes-for-rf-switching pp. 11.

* cited by examiner

*Primary Examiner* — Thanh C Le
(74) *Attorney, Agent, or Firm* — Allen, Dyer, Doppelt + Gilchrist, P.A.

(57) ABSTRACT

An RF device may include RF circuitry having a PIN diode configured to switch an RF signal, and a biasing circuit. The biasing circuit may include a controllable power supply having a control input and an current output coupled to the PIN diode to selectively bias the PIN diode into an ON state, and a feedback circuit coupled between the current output and the control input of the controllable power supply to set a current delivered to the PIN diode in the ON state.

24 Claims, 6 Drawing Sheets

US 11,546,011 B1

RF DEVICE WITH BIASING CIRCUIT FOR PIN DIODE AND RELATED METHODS

TECHNICAL FIELD

The present disclosure relates to the field of communications, and, more particularly, to wireless communications devices and related methods.

BACKGROUND

Mobile communications devices are deployed to government personnel, and emergency service providers. In some applications, the mobile communications device is handheld, but in other applications, the mobile communications device may be more bulky, yet still portable, such as a manpack radio, as available from the L3Harris Corporation of Melbourne, Fla. The typical mobile communications device includes an antenna, and a transceiver coupled to the antenna. The transceiver and the antenna cooperate to transmit and receive communications signals.

For transmission, the typical mobile communications device modulates digital data onto an analog signal. As will be readily appreciated by the skilled person, there are several modulations available for most applications. For most communications devices, the transmitted and received signals are spectrally limited. In other words, the communications device operates within an expected frequency range, such as the ultra high frequency (UHF) range or the very high frequency (VHF) range. Because of the known operational characteristic, the communications device is usually designed to operate within the expected frequency range. Nevertheless, as communications devices have become more robust in the included feature set, some applications demand operating within multiple frequency bands, i.e. a multi-band device.

In some multi-band devices, such as the aforementioned manpack radio, the transmit/receive architecture may comprise a plurality of paths with respective amplifiers/receivers and antennas. To accommodate the multiple antennas, the radio device includes switches downstream to route the transmitted signal to the proper path. In some applications, PIN diodes may serve as the switches to route the transmit/receive signals. These applications may also include biasing circuits to bias the PIN diode in a desired state (i.e. ON and OFF states).

In one example approach, as shown in FIG. 1, a radio frequency (RF) device 100 includes a voltage source 101, a resistor 102 coupled to the voltage source, and an inductor 103 coupled to the resistor. The RF device 100 also includes a PIN diode 104 coupled to the inductor 103. A potential drawback to this approach is high power consumption.

SUMMARY

Generally, an RF device may include RF circuitry comprising at least one PIN diode configured to switch an RF signal, and a biasing circuit. The biasing circuit may include a controllable power supply having a control input and an current output coupled to the at least one PIN diode to selectively bias the at least one PIN diode into an ON state, and a feedback circuit coupled between the current output and the control input of the controllable power supply to set a current delivered to the at least one PIN diode in the ON state.

In some embodiments, the controllable power supply may comprise a switched mode power supply (SMPS). Also, the biasing circuit may comprise a current sense resistor having a first terminal coupled to the current output, and a second terminal coupled to the at least one PIN diode. The biasing circuit may comprise a filter coupled to current output. The biasing circuit may also include an inductor coupled between the second terminal of the current sense resistor and the at least one PIN diode.

Moreover, the biasing circuit may be configured to generate the current delivered as a constant current. The biasing circuit may be configured to maintain the constant current based upon an operating temperature of the at least one PIN diode. The at least one PIN diode may comprise a plurality of PIN diodes in some embodiments. The feedback circuit may comprise a plurality of resistors.

Another aspect is directed to a communication device comprising an antenna, and RF circuitry coupled to the antenna. The RF circuitry may include at least one PIN diode configured to switch an RF signal to the antenna, and a biasing circuit. The biasing circuit may include a controllable power supply having a control input and an current output coupled to the at least one PIN diode to selectively bias the at least one PIN diode into an ON state, and a feedback circuit coupled between the current output and the control input of the controllable power supply to set a current delivered to the at least one PIN diode in the ON state.

Yet another aspect is directed to a method for operating RF circuitry comprising at least one PIN diode, and a biasing circuit having a controllable power supply and a feedback circuit. The method may include operating the at least one PIN diode to switch an RF signal, and operating the controllable power supply having a control input and an current output coupled to the at least one PIN diode to selectively bias the at least one PIN diode into an ON state. The method may further include operating the feedback circuit coupled between the current output and the control input of the controllable power supply to set a current delivered to the at least one PIN diode in the ON state.

DETAILED DESCRIPTION

Figure 1:
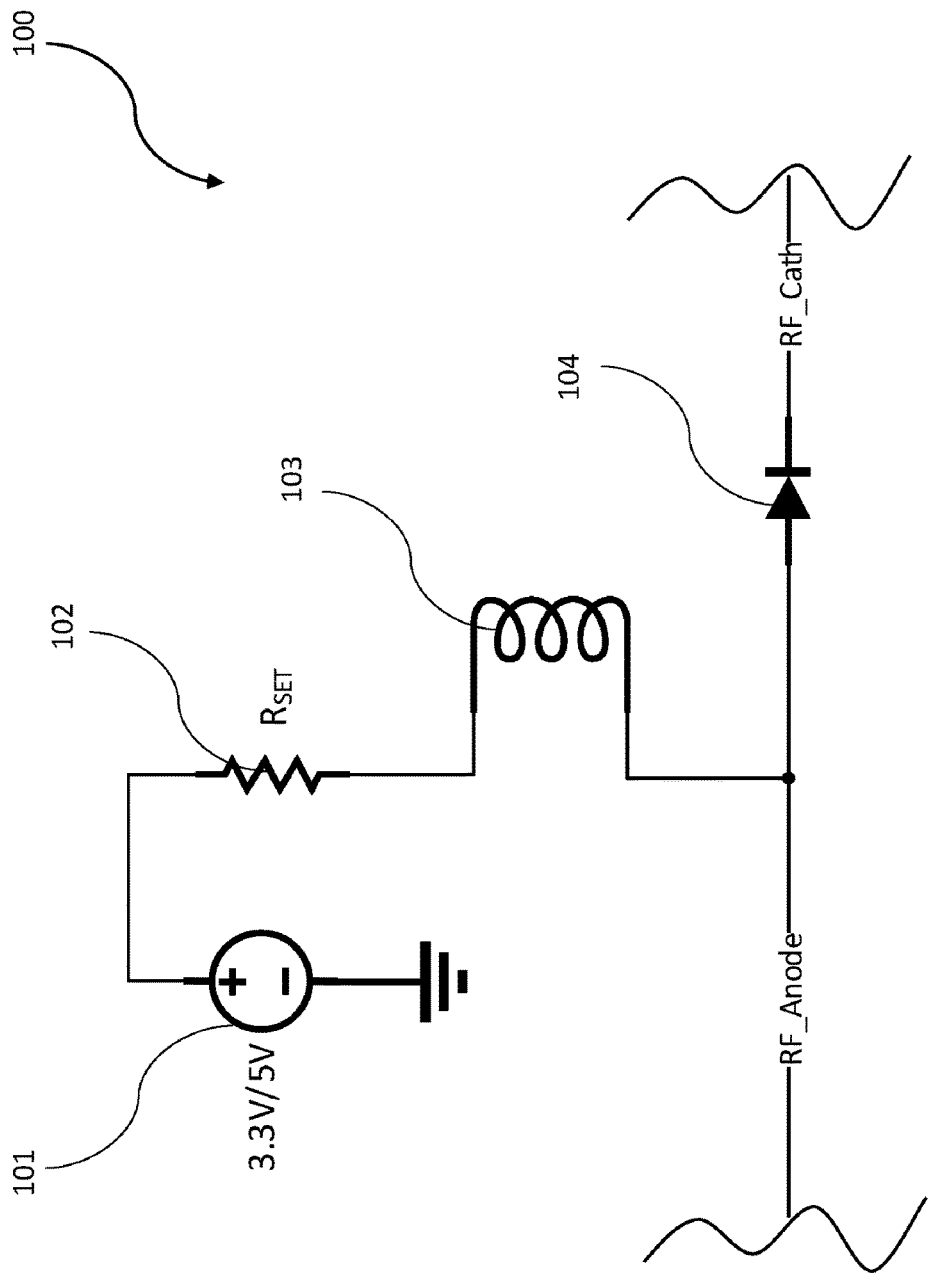
FIG. 1 is a schematic diagram of an RF device, according to the prior art.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

In typical approaches, such as in the RF device 100 of FIG. 1, the biasing of the PIN diode 104 may use fixed voltages with resistors to set the bias current through the PIN diode 104. The power consumption of the RF device 100 may not be desirable due to the resistor 102.

In some applications where miniaturization is useful, this approach is less than desirable due to reduced circuit space limiting heat dissipation. In particular, to achieve desirable insertion-loss with the PIN diode 104, a high-current (30-100 mA) may be applied to bias the PIN diode in the ON state, and this has a power dissipation projection between 0.3-1.5 W. Moreover, in multichannel applications, the amount of heat radiated may be increased, possibly causing performance issues.

Figure 2:
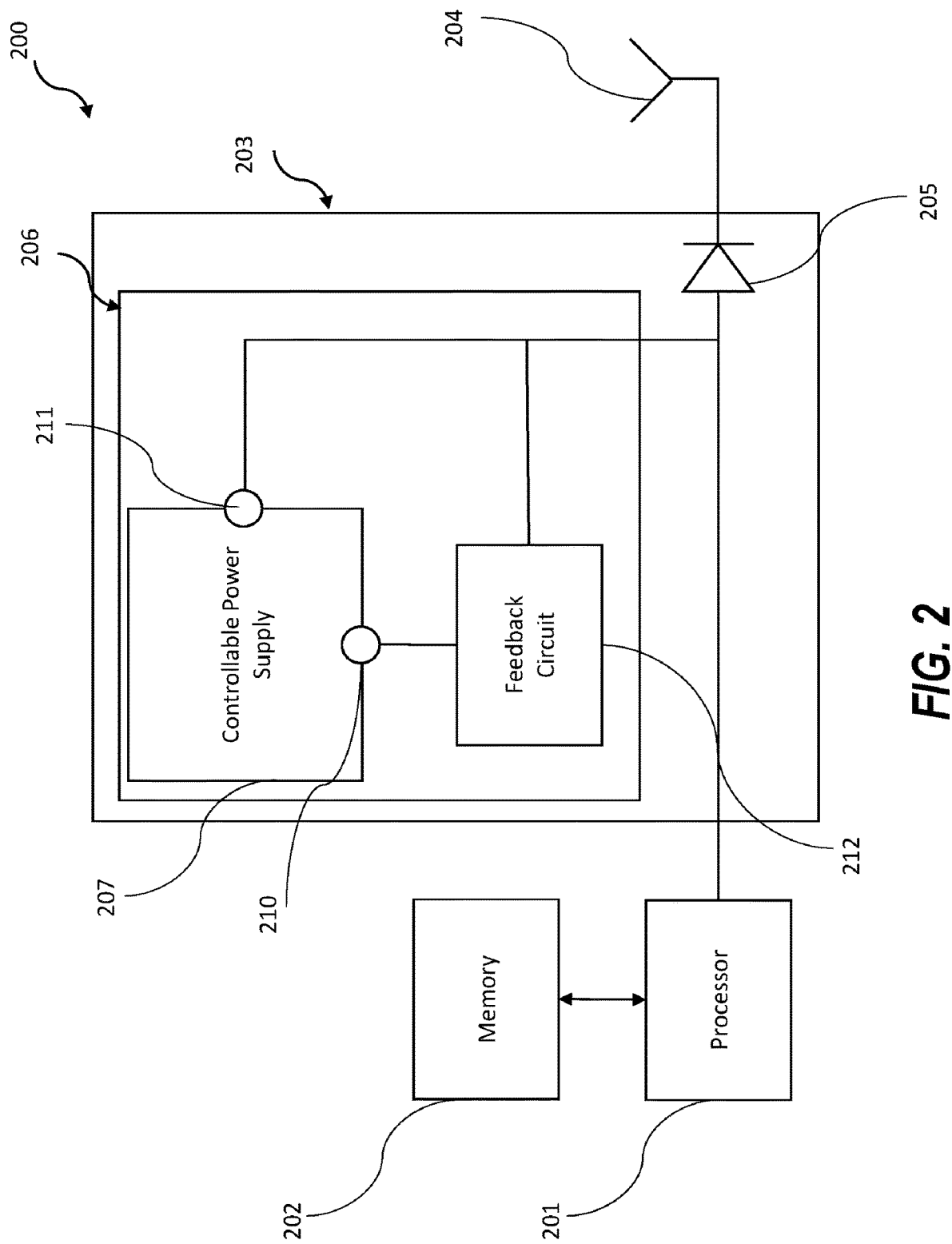
FIG. 2 is a schematic diagram of a communication device, according to a first embodiment of the present disclosure.

Referring initially to FIG. 2, a communication device 200 according to the present disclosure is now described. The communication device 200 may provide an approach to the potential drawbacks in biasing PIN diodes in typical devices.

The communication device 200 illustratively comprises a processor 201 and a memory 202 coupled thereto to generate an RF signal (i.e. a baseband signal), RF circuitry 203 coupled to the processor, and an antenna 204 coupled to the RF circuitry. Although not depicted for the sake of drawing simplification, the RF circuitry 203 may include upstream/downstream transmit and receive components, such as amplifiers and filters, for example.

The RF circuitry 203 illustratively includes a PIN diode 205 configured to switch the RF signal to the antenna 204, and the antenna is coupled to a cathode of the PIN diode. Although not depicted, the PIN diode 205 may switch the RF signal to other paths, such as a harmonic filter path.

The RF circuitry 203 illustratively comprises a biasing circuit 206 having a controllable power supply 207 having a control input 210 (e.g. a feedback voltage port), and a current output 211 coupled to the PIN diode 205 to selectively bias the PIN diode into an ON state. The biasing circuit 206 includes a feedback circuit 212 coupled between the current output 211 and the control input 210 of the controllable power supply 207 to set a current delivered to the PIN diode 205 in the ON state.

Figure 3:
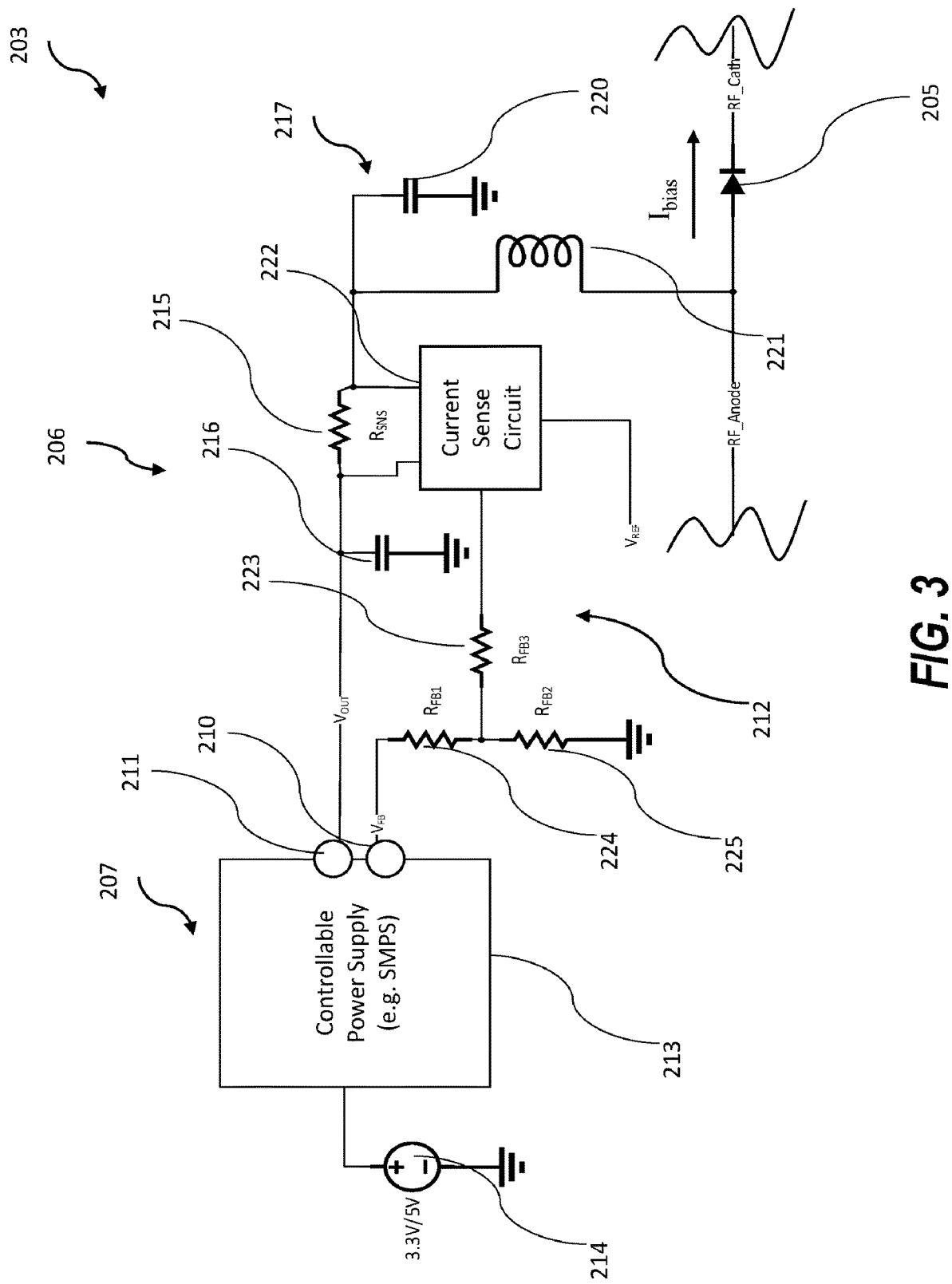
FIG. 3 is a more detailed schematic diagram of the communication device of FIG. 2.

Referring now additionally to FIG. 3, the controllable power supply 207 comprises a SMPS 213, and a voltage source 214 coupled to the SMPS. For example, the voltage source 214 may provide either 3.3 V or 5 V to the SMPS.

The biasing circuit 206 illustratively comprises a current sense resistor 215 having a first terminal coupled to the current output 211, and a second terminal coupled to the PIN diode 205. The biasing circuit 206 comprises a first capacitor 216 coupled between the first terminal of the current sense resistor 215 and a reference voltage (e.g. the illustrated ground potential). The biasing circuit 206 also comprises a filter 217 coupled to current output 211. The filter 217 illustratively includes a second capacitor 220 coupled between the second terminal of the current sense resistor 215 and the reference voltage, and an inductor 221 coupled between the second terminal of the current sense resistor and the PIN diode 205.

The feedback circuit 212 illustratively comprises a current sense circuit 222 (e.g. a current sense amplifier) coupled to the first and second terminals of the current sense resistor 215, and a first resistor 223 coupled to the current sense circuit. The feedback circuit 212 also includes a second resistor 224 and a third resistor 225 coupled in series to the second resistor, and between the control input 210 and the reference voltage. The first resistor 223 is coupled in between the second resistor 224 and the third resistor 225.

Moreover, the biasing circuit 206 is configured to generate the current delivered as a constant current. The biasing circuit 206 is configured to maintain the constant current based upon an operating temperature of the PIN diode 205. In particular, as will be appreciated by the skilled person, when the operating temperature of the PIN diode 205 increases, the forward bias voltage of the PIN diode may reduce. In typical approaches, such as in the RF device 100, the applied voltage would be constant and the current through the PIN diode 205 would increase, thereby radiating more heat. Helpfully, the biasing circuit 206 maintains a constant bias current through the PIN diode 205 even with variable operational characteristics (i.e. without consideration to operating temperature).

Here, in the communication device 200, the SMPS 213 is used as a current source to drive the PIN diode 205. The output voltage of the SMPS 213 may effectively float to around the same voltage as the forward voltage of the PIN diode 205, which may reduce the required power to bias the PIN diode in the ON state.

As will be appreciated, the SMPS 213 may inject noise into its output. Helpfully, in the communication device 200, the noise is suppressed since the biasing circuit 206 is fed into the anode of the PIN diode 205 and due to the properties of the PIN diode (i.e. long carrier lifetime effectively reducing any modulation).

Yet another aspect is directed to a method for operating RF circuitry 203 comprising at least one PIN diode 205, and a biasing circuit 206 having a controllable power supply 207 and a feedback circuit 212. The method includes operating the at least one PIN diode 205 to switch an RF signal, and operating the controllable power supply 207 having a control input 210 and an current output 211 coupled to the at least one PIN diode to selectively bias the at least one PIN diode into an ON state. The method further includes operating the feedback circuit 212 coupled between the current output 211 and the control input 210 of the controllable power supply 207 to set a current delivered to the at least one PIN diode 205 in the ON state.

Advantageously, the communication device 200 may implement a legacy current setting device (i.e. a resistor) as a high-efficiency step-down SMPS regulator (SMPS 213) with current sensing connected to the current output 211. The feedback circuit 212 may provide feedback into the SMPS 213 to modify the voltage and achieve the desired bias current through the PIN diode 205. This may provide for a high-efficiency step-down constant current source regulator. Moreover, the biasing circuit 206 is temperature self-compensating. When the PIN diode 205 forward voltage decreases due to heating, the output voltage of the SMPS 213 will decrease keeping the current constant through the PIN diode 205.

Moreover, in testing an example embodiment of the communication device 200, the power consumption was compared with a prior art RF device for transmitting several waveforms (AN/PRC-163, AN/PRC-167, AN/PRC-158). Helpfully, the communication device 200 may provide a power savings as high as 73%. (See Table 1). As will be appreciated, for mobile applications dependent on battery power, this would increase operational time before total battery discharge. In some example applications, the teachings of the communication device 200 improved operational time by 20 or more minutes and reduced skin temperature of the device housing by 2° C.

TABLE 1

| Radio | | Prior Art Power (W) | Power for Example (W) | Savings |
|---|---|---|---|---|
| AN/PRC-163 | LB TX | 1.03 | 0.278 | 73% |
|  | HB TX | 0.79 | 0.300 | 62% |
| AN/PRC-167 | LB TX | 0.44 | 0.133 | 70% |
|  | HB TX | 0.22 | 0.066 | 70% |
| AN/PRC-158 | LB TX | 0.76 | 0.289 | 62% |
|  | HB TX | 0.29 | 0.087 | 70% |

The communication device 200 may be integrated with automatic gain control and transmit gain control circuits to have selectable control over PIN bias based on transmit output power or receive power input overload. This may further reduce power consumption in low probability of detection (LPD) applications and could prevent PIN diode 205 damage in receive mode from jamming.

Figure 4:
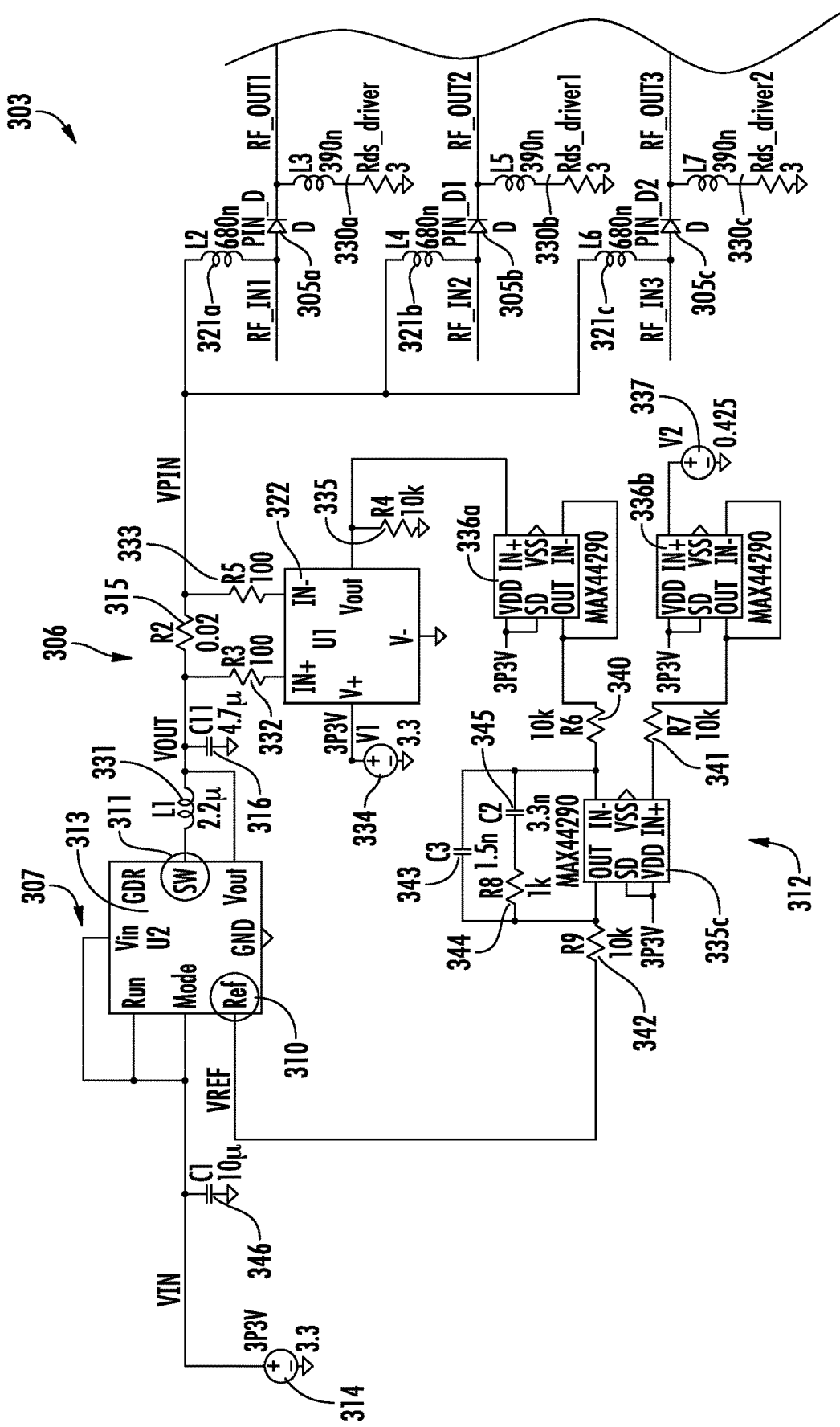
FIG. 4 is a circuit diagram of RF circuitry, according to a second embodiment of the present disclosure.

Referring now additionally to FIG. 4, another embodiment of the RF circuitry 303 is now described. In this embodiment of the RF circuitry 303, those elements already discussed above with respect to FIGS. 2-3 are incremented by 100 and most require no further discussion herein. This embodiment differs from the previous embodiment in that this RF circuitry 303 illustratively includes a plurality of PIN diodes 305a-305c coupled to the biasing circuit 306. As will be appreciated by those skilled in the art, the plurality of PIN diodes 305a-305c may route the RF signal to a corresponding plurality of transmit/receive paths.

The RF circuitry 303 illustratively comprises resistor/inductor pairs 330a-330c coupled respectively to a cathode of the plurality of PIN diodes 305a-305c. In these resistor/inductor pairs 330a-330c, the inductor is an RF Choke to isolate the RF signal from the ground return circuitry for the PIN diode bias current. In a real implementation (instead of simulation), this inductor would also connect to a capacitor on the Rds side. The resistor is a representation of the effective resistance (Rds, Resistance drain-source) of a N-channel MOSFET that is grounding the cathode the PIN diode (Similar function to the single pole double throw switches 430a-430c in FIGS. 5A-5B).

The biasing circuit 306 illustratively includes an inductor 331 coupled to the SMPS 313, and resistors 332-333 respectively coupled to the terminals of the current sense resistor 315. The biasing circuit 306 includes a voltage source 334 coupled to the current sense circuit 322 (e.g. illustrated LT6105 current sense amplifier, as available from Linear Technology Corporation of Milpitas, Calif.), and a resistor 335 coupled to the current sense circuit. The biasing circuit 306 includes a first operational amplifier 336a coupled to the resistor 335, a second operational amplifier 336b, and a voltage source 337 coupled to the second operational amplifier. The biasing circuit 306 includes resistors 340-341 respectively coupled to outputs of the first operational amplifier 336a and the second operational amplifier 336b, and a third operational amplifier 336c coupled to the resistors 340-341. For example, each of the operational amplifiers 336a-336c may comprise the illustrated MAX44290 operational amplifier, as available from Maxim Integrated of San Jose, Calif.).

The biasing circuit 306 includes a resistor 342 coupled to an output of the third operational amplifier 336c, a capacitor 343 coupled in feedback for the third operational amplifier 336c, and a resistor 344 and capacitor 345 coupled in series and also in feedback for the third operational amplifier. The biasing circuit 306 includes a capacitor 346 coupled between the voltage source 314 and the SMPS 313.

Figure 5A:
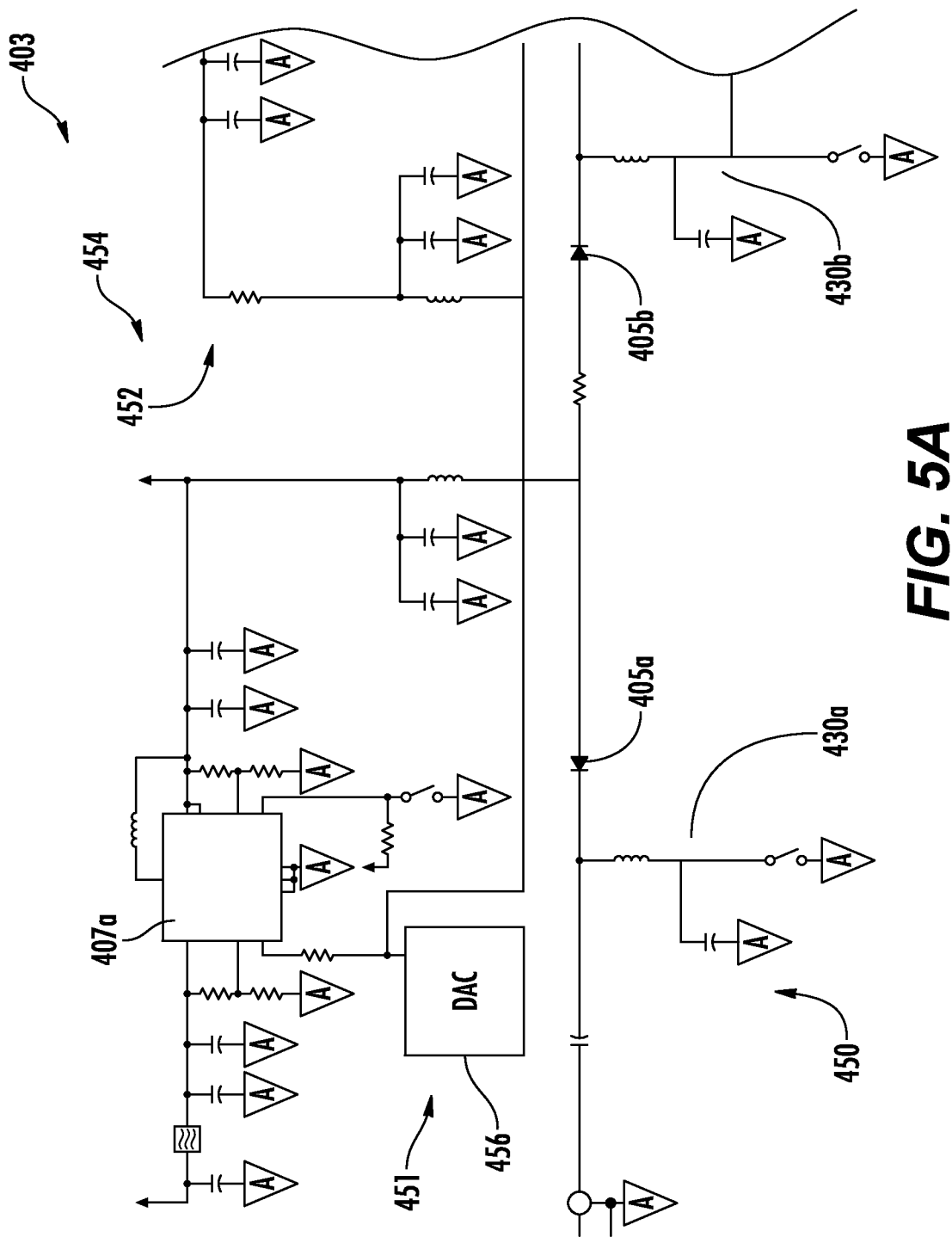
FIGS. 5A and 5B are a circuit diagram of RF circuitry, according to a third embodiment of the present disclosure.
Figure 5B:
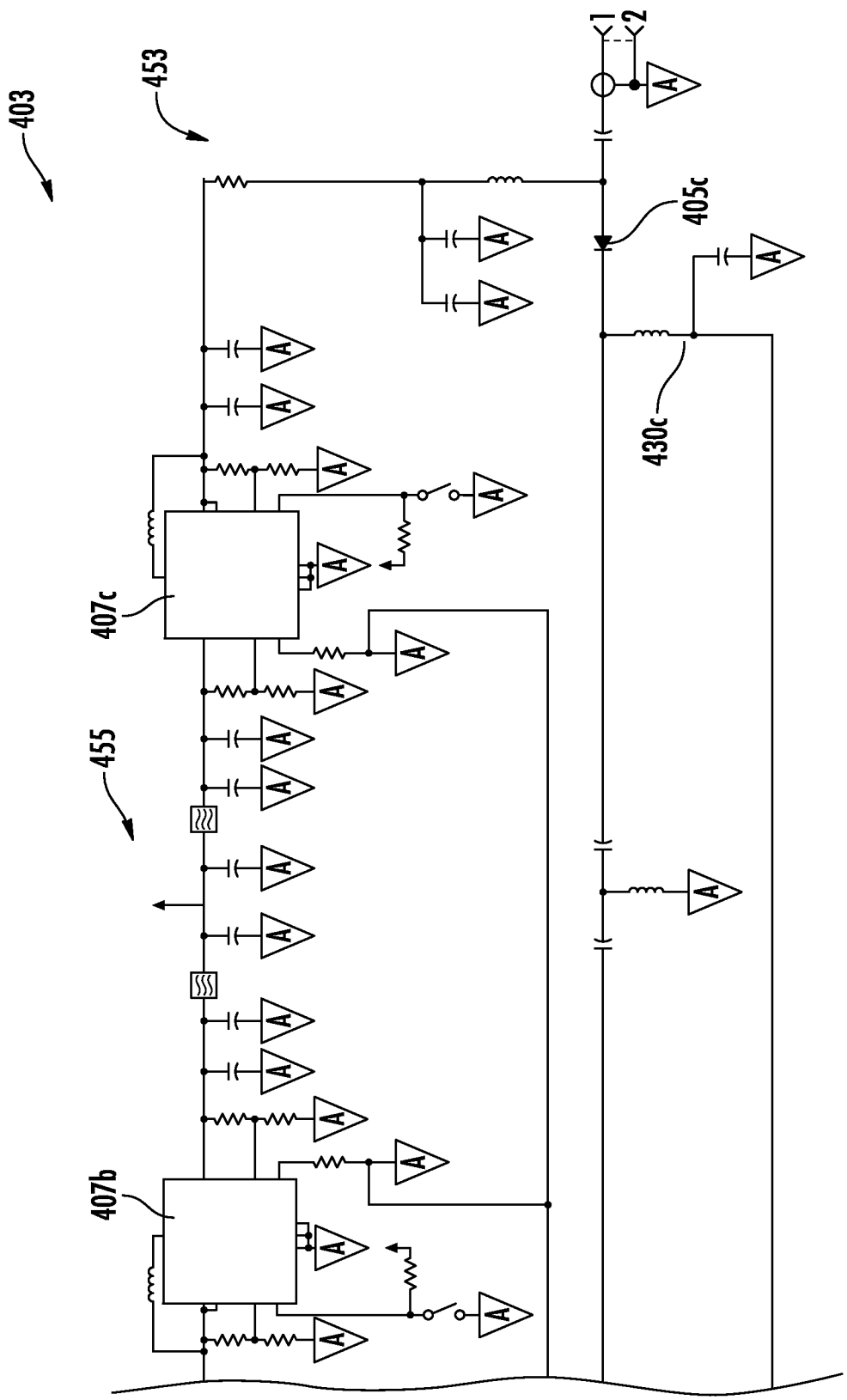

Referring now additionally to FIGS. 5A-5B, another embodiment of the RF circuitry 403 is now described. In this embodiment of the RF circuitry 403, those elements already discussed above with respect to FIGS. 2-3 are incremented by 200 and most require no further discussion herein. This embodiment differs from the previous embodiment in that this RF circuitry 403 illustratively includes a plurality of PIN diodes 405a-405c, and a plurality of controllable power supplies 407a-407c. Each of the plurality of controllable power supplies 407a-407c may comprise a MAX38886 power regulator, as available from Maxim Integrated of San Jose, Calif. The output of the first controllable power supply 407a is used to bias the first and second PIN diodes 405a-405b. The output of the third controllable power supply 407c is used to bias the third PIN diode 405c.

Also, the RF circuitry 403 illustratively comprises a pseudo pin reverse bias circuit 450 for the PIN diode 405a for testing the OFF state of the PIN diode, and a bias tuning circuit 451. The RF circuitry 403 illustratively includes first and second common contact pads 452, 453. The RF circuitry 403 illustratively includes a first circuit network 454 coupled between the first and second controllable power supply 407a-407b, and a second circuit network 455 coupled between the second and third controllable power supply 407b-407c.

Here, the pseudo pin reverse bias circuit 450 serves as a high-voltage reverse bias for the PIN diode 405a to turn it off (i.e. 120V). Essentially, this circuit serves as a single pole double throw switch between 0V and 120V.

The bias tuning circuit 451 serves the same function as the voltage source 337 in the above embodiments. In short, the bias tuning circuit 451 controls the level of the constant current. In this implementation, this would be sourced from a digital-to-analog converter 456. The first and second common contact pads 452, 453 are test connections. The example embodiment was made so that each PIN diodes 405a-405c could be biased with a separate supply or all three could be biased from a single supply.

In this example embodiment of the RF circuitry 403, the biasing function is achieved with no special attention to temperature (i.e. no temperature sensor required). This is due to the current sensor setting a constant current, regardless of the PIN diode forward voltage. As will be appreciated, this is a benefit of Efficient PIN Diode Bias (EPDB).

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A radio frequency (RF) device comprising:
   RF circuitry comprising at least one PIN diode configured to switch an RF signal; and
   a biasing circuit comprising
      a controllable power supply having a control input and a current output coupled to the at least one PIN diode to selectively bias the at least one PIN diode into an ON state, and
      a feedback circuit coupled between the current output and the control input of the controllable power supply to set a current delivered to the at least one PIN diode in the ON state.

2. The RF device of claim 1 wherein the controllable power supply comprises a switched mode power supply (SMPS).

3. The RF device of claim 1 wherein the biasing circuit comprises a current sense resistor having a first terminal coupled to the current output, and a second terminal coupled to the at least one PIN diode.

4. The RF device of claim 3 wherein the biasing circuit comprises a filter coupled to current output.

5. The RF device of claim 3 wherein the biasing circuit comprises an inductor coupled between the second terminal of the current sense resistor and the at least one PIN diode.

6. The RF device of claim 1 wherein the biasing circuit is configured to generate the current delivered as a constant current.

7. The RF device of claim 6 wherein the biasing circuit is configured to maintain the constant current based upon an operating temperature of the at least one PIN diode.

8. The RF device of claim 1 wherein the at least one PIN diode comprises a plurality thereof.

9. The RF device of claim 1 wherein the feedback circuit comprises a plurality of resistors.

10. A communication device comprising:
an antenna; and
RF circuitry coupled to the antenna and comprising at least one PIN diode configured to switch an RF signal to the antenna, and a biasing circuit comprising
a controllable power supply having a control input and a current output coupled to the at least one PIN diode to selectively bias the at least one PIN diode into an ON state, and
a feedback circuit coupled between the current output and the control input of the controllable power supply to set a current delivered to the at least one PIN diode in the ON state.

11. The communications device of claim 10 wherein the controllable power supply comprises a switched mode power supply (SMPS).

12. The communications device of claim 10 wherein the biasing circuit comprises a current sense resistor having a first terminal coupled to the current output, and a second terminal coupled to the at least one PIN diode.

13. The communications device of claim 12 wherein the biasing circuit comprises a filter coupled to current output.

14. The communications device of claim 12 wherein the biasing circuit comprises an inductor coupled between the second terminal of the current sense resistor and the at least one PIN diode.

15. The communications device of claim 10 wherein the biasing circuit is configured to generate the current delivered as a constant current.

16. The communications device of claim 15 wherein the biasing circuit is configured to maintain the constant current based upon an operating temperature of the at least one PIN diode.

17. The communications device of claim 10 wherein the at least one PIN diode comprises a plurality thereof.

18. A method for operating a radio frequency (RF) circuitry comprising at least one PIN diode, and a biasing circuit having a controllable power supply and a feedback circuit, the method comprising:
operating the at least one PIN diode to switch an RF signal;
operating the controllable power supply having a control input and a current output coupled to the at least one PIN diode to selectively bias the at least one PIN diode into an ON state; and
operating the feedback circuit coupled between the current output and the control input of the controllable power supply to set a current delivered to the at least one PIN diode in the ON state.

19. The method of claim 18 wherein the controllable power supply comprises a switched mode power supply (SMPS).

20. The method of claim 18 wherein the biasing circuit comprises a current sense resistor having a first terminal coupled to the current output, and a second terminal coupled to the at least one PIN diode.

21. The method of claim 20 wherein the biasing circuit comprises a filter coupled to current output.

22. The method of claim 20 wherein the biasing circuit comprises an inductor coupled between the second terminal of the current sense resistor and the at least one PIN diode.

23. The method of claim 18 comprising operating the biasing circuit to generate the current delivered as a constant current.

24. The method of claim 23 comprising operating the biasing circuit to maintain the constant current based upon an operating temperature of the at least one PIN diode.

* * * * *